(12) United States Patent
Briggs et al.

(10) Patent No.: US 11,669,873 B2
(45) Date of Patent: Jun. 6, 2023

(54) INTERACTIVE PRODUCT PLACEMENT SYSTEM AND METHOD THEREFOR

(71) Applicant: AiBUY, Inc., Dallas, TX (US)

(72) Inventors: Christian Briggs, Newport Coast, CA (US); Heath McBurnett, Austin, TX (US); Delfino Galindo, Jr., Laguna Niguel, CA (US); Freddy Knuth, Euless, TX (US)

(73) Assignee: AiBUY, Inc., Dallas, TX (US)

( * ) Notice: Subject to any disclaimer, the term of this patent is extended or adjusted under 35 U.S.C. 154(b) by 0 days.

(21) Appl. No.: 17/577,164

(22) Filed: Jan. 17, 2022

(65) Prior Publication Data

US 2022/0391951 A1 Dec. 8, 2022

Related U.S. Application Data

(63) Continuation of application No. 16/595,149, filed on Oct. 7, 2019, now Pat. No. 11,227,315, which is a continuation of application No. 16/034,900, filed on Jul. 13, 2018, now Pat. No. 10,438,249, which is a continuation of application No. 14/079,385, filed on Nov. 13, 2013, now Pat. No. 10,055,768, which is a continuation of application No. 12/787,505, filed on May 26, 2010, now abandoned, which is a continuation-in-part of application No. 12/363,713, filed on Jan. 30, 2009, now Pat. No. 8,312,486.

(60) Provisional application No. 61/024,829, filed on Jan. 30, 2008.

(51) Int. Cl.
G06Q 30/02 (2012.01)
G06Q 30/0241 (2023.01)
G06Q 30/0251 (2023.01)

(52) U.S. Cl.
CPC ..... *G06Q 30/0277* (2013.01); *G06Q 30/0251* (2013.01)

(58) Field of Classification Search
CPC .............. G06Q 30/0277; G06Q 30/0251
See application file for complete search history.

(56) References Cited

U.S. PATENT DOCUMENTS

| 8,813,118 B2* | 8/2014 | Bhatnagar | H04N 21/812 |
| | | | 725/35 |
| 2007/0157228 A1* | 7/2007 | Bayer | H04N 21/2668 |
| | | | 348/E7.071 |
| 2007/0300280 A1* | 12/2007 | Turner | H04N 21/858 |
| | | | 725/135 |

(Continued)

*Primary Examiner* — Nathan J Flynn
*Assistant Examiner* — Christine A Kurien
(74) *Attorney, Agent, or Firm* — Cooley LLP

(57) ABSTRACT

A method for facilitating the order of commercial products in connection with the display of media content, whereby a player comprises a media production component and an interactive e-commerce component embedded therein. The player with the e-commerce component can be virally copied and propagated from one web page to any number of other web pages. A method for presenting advertisements for commercial products in video productions, whereby the commercial product is placed in the video production as an element of the video production. A viewer is enabled to interact with the video production to select the product. Information is then displayed about the selected product; and the viewer is enabled to purchase the selected product.

20 Claims, 16 Drawing Sheets

(56) References Cited

U.S. PATENT DOCUMENTS

2008/0187279 A1* 8/2008 Gilley ................ H04N 7/17318
386/250
2008/0319852 A1* 12/2008 Gardner ................ G06Q 30/02
705/14.4
2009/0083815 A1* 3/2009 McMaster .......... H04N 21/8586
725/110

* cited by examiner

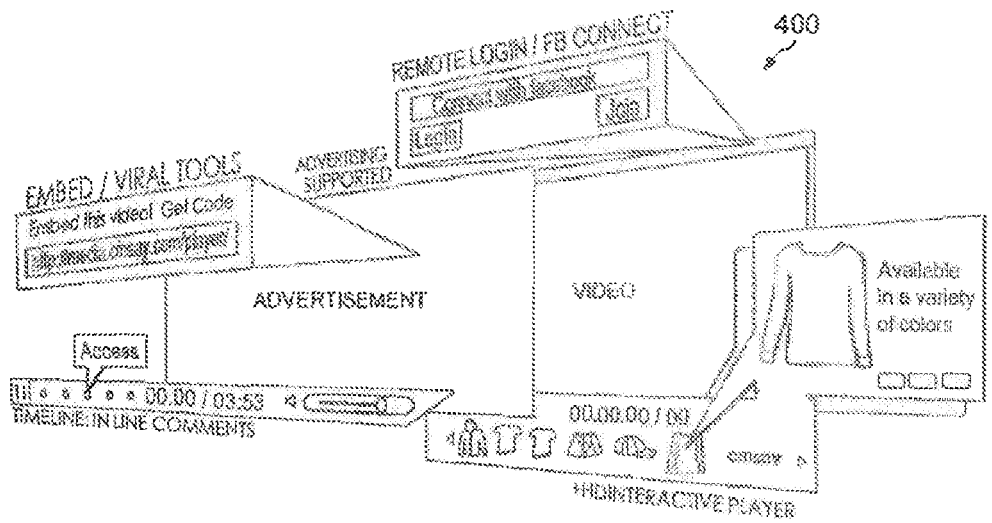

APPLICATION EMBED CODE EXAMPLE
(UTILIZING STANDARD EMBED CODE INTEGRATION INTO REMOTE ONLINE DESTINATIONS)

```
<object classid='clsid:D27CDB6E-AE6D-11cf-96B8-444553540000'
        id='SyndicatedPlayer' width='315' height='446'
        codebase='http://fpdownload.macromedia.com/get/flashplayer/current/swflash.cab'>
    <param name='movie' value='http://www.cinsay.com/player/SyndicatedPlayer.swf?playerid=fs000080000ia001ps80000000' />
    <param name='quality' value='high' />
    <param name='bgcolor' value='#000000' />
    <param name='wmode' value='transparent' />
    <param name='allowfullscreen' value='true' />
    <param name='allowScriptAccess' value='sameDomain' />
    <embed src='http://www.cinsay.com/player/SyndicatedPlayer.swf?playerid=fs000080000ia001ps80000000' quality='high' bgcolor='#000000'
        width='100%' height='100%' name='SyndicatedPlayer' align='middle'
        play='true'
        loop='false'
        quality='high'
        wmode='transparent'
        allowScriptAccess='sameDomain'
        allowFullScreen='true'
        type='application/x-shockwave-flash'
        pluginspage='http://www.adobe.com/go/getflashplayer'>
    </embed>
</object>
</noscript>
```

FIG. 3

INTERACTIVE PRODUCT PLACEMENT SYSTEM AND METHOD THEREFOR

CROSS-REFERENCE TO RELATED APPLICATIONS

This application is a continuation of U.S. patent application Ser. No. 16/595,149, filed Oct. 7, 2019, entitled "INTERACTIVE PRODUCT PLACEMENT SYSTEM AND METHOD THEREFOR," which is a continuation of U.S. patent application Ser. No. 16/034,900, filed Jul. 13, 2018, (now U.S. Pat. No. 10,438,249, issued Oct. 8, 2019), entitled "INTERACTIVE PRODUCT PLACEMENT SYSTEM AND METHOD THEREFOR, which is a continuation of U.S. patent application Ser. No. 14/079,385, filed Nov. 13, 2013 (now U.S. Pat. No. 10,055,768, issued Aug. 21, 2018), entitled "INTERACTIVE PRODUCT PLACEMENT SYSTEM AND METHOD THEREFOR," which is a continuation of U.S. patent application Ser. No. 12/787,505, filed May 26, 2010, which is a continuation-in-part of U.S. patent application Ser. No. 12/363,713, filed Jan. 30, 2009 (now U.S. Pat. No. 8,312,486, issued Nov. 13, 2012), which claims priority to and benefit of U.S. Provisional Patent Application No. 61/024,829, filed Jan. 30, 2008; the entirety of each of the aforementioned applications is hereby expressly incorporated by reference, as if fully set forth herein, for all purposes.

TECHNICAL FIELD

The invention relates generally to interactive media content distribution, and, more particularly, to the placement in a viral player of products associated with media content for interactive purchase. The invention relates generally to interactive video broadcasting, and, more particularly, to placement of products in video broadcast for interactive purchase.

BACKGROUND

Using existing technology, e-commerce purchases are typically facilitated on the Internet by directing consumers to purchase products through specified websites. It is well-known that video may be broadcast or provided through a number of media, such as television, the Internet, DVD, and the like. To finance such video broadcast, commercial advertisements are often placed in the video. Commercials, however, require that the video be momentarily interrupted while the commercial is displayed. Not only is that annoying to viewers, but modem technology has developed digital video recorders (DVR's) that allow video programs to be pre-recorded, and when viewed, to fast-forward through commercials, thereby defeating the effectiveness and, hence, value of commercials. When commercials are de-valued, costs are not adequately covered, and as a result, broadcast service quality suffers. In many cases, costs are made up by charging viewers for the video service. Therefore, what is needed is a system and method for advertising commercial products in such a way that they are not annoying and do not interrupt a video production, prompting a user fast-forward through them.

SUMMARY

With existing technology, a consumer on the Internet may be directed to a specific website via online advertising or sponsored links, where such websites describe specific products available for purchase, allow the consumer to choose a product for purchase, and direct the consumer to purchase the product through an e-commerce application from that website. Thus, one drawback with existing technology is that it requires the consumer to navigate to a specific website to purchase a product, which can be time-consuming and discourage product purchases.

Furthermore, using existing technology, products advertised on the Internet are traditionally advertised through banner advertising, "clickable" ads, sponsored links, or the like. Such advertising can range from static graphical images to rich media content, permitting the user to "click" on the ad and be redirected to a new web page (either in a new browser window or a new tab in the user's browser) to display the product, describe the product, and provide a mechanism to facilitate the purchase through an e-commerce application through that website. If a user is watching and/or listening to media content when the purchase is desired, then it can be very distracting to have to navigate to another web page to purchase the product and, when attempting to return to the media content, the user may potentially lose the media content or lose the place in the media content requiring that the media content be restarted, frustrating a user and discouraging future purchases, and further resulting in lost revenues and business.

Still further, with existing technology, most product marketing on the Internet is achieved through banner advertising, "click-through" ads, or similar commercials run on a media player on a specific website. Although such ads can be placed on different websites through contractual arrangements with web site owners and ad server networks, such ads are limited to specific areas designated for advertising on such websites, thereby limiting the scope of advertising to users who visit such specific websites, and further limiting such scope to the specific number of ad rolls associated with the traffic to such website or imposing other ad servicing provider limitations on the number of times such advertising for the product is presented on such websites, thereby restricting a user's opportunity to purchase the advertised product.

Therefore, what is needed is a system and method for facilitating e-commerce transactions without requiring that a consumer navigate to another website to engage in a transaction for the purchase of a product, without excessively distracting a consumer when watching and/or listening to media content, without limiting the marketing of a product through ads in specific areas designated for advertising on specific websites, without limiting the scope of advertising to users who visit such specific websites, and without limiting the marketing of a product to a specific number of ad rolls or other ad servicing provider limitations on the number of times advertising for products is presented on such websites.

The present invention, accordingly, permits a consumer to view a product in conjunction with a viral player, and to select the product for purchase within the player, rather than be redirected to a separate website. There is thus no longer a need to go to a specific website to purchase a product; the viral player acts as the vehicle to facilitate the "front-end" of the purchase.

Furthermore, products can be displayed in connection with specified content at the player level—the present invention brings the e-commerce "store" directly to the user, rather than directing the user to a specified website. Specifically, the player can run media content within the player frame, with associated products listed in a separate area of the player that the user can "click" on to facilitate the purchase through the e-commerce platform back-end. Essentially, the user is able to view and purchase a product within the player while watching or listening to media content, thereby bringing the ability to facilitate the sale of a product as part of the rich media experience.

Still further, products may be marketed "virally", permitting content owners to monetize content. In accordance with the present invention, the syndicated e-commerce player is designed to be embeddable so that users can place it in emails to friends, on social networking sites (e.g. FACEBOOK, MYSPACE, GOOGLE BUZZ, YELP, etc.), or other websites, thereby permitting the syndicated e-commerce player to be distributed virally on the Internet. As a result, the products that are listed in the syndicated e-commerce player can be marketed virally without such restrictions, directly to potential consumers who will be able to view or listen to the media content of the syndicated e-commerce player and immediately purchase the associated product(s) from within the syndicated e-commerce player without being redirected from the media experience.

In one embodiment, the present invention achieves the aforementioned features in a method for facilitating the purchase of commercial products in connection with the display of media content, whereby a player comprises a media production component and an interactive e-commerce component embedded therein. The player with the ecommerce component can be virally copied and propagated from one web page to any number of other web pages.

In another embodiment, a player frame is generated in a first web page. At least a first portion of the player frame is reserved for said media content, and at least a second portion of the player frame is reserved for an interactive e-commerce component. Code is embedded in the player frame for retrieving the media content and placing the media content in the first portion of said player, and code is embedded in the player frame for retrieving the interactive e-commerce component and placing the interactive e-commerce component in the second portion of the player. The player frame may then be virally copied and propagated from one web page to any number of other web pages. A system for implementing the sale of a product in connection with the display of media content includes an enterprise nucleus, and one or more syndicated e-commerce applications coupled in data communication to the enterprise nucleus. The one or more syndicated e-commerce applications include an input terminal for facilitating entry of data by a user and an output terminal for communicating data to a user. An e-commerce platform is coupled in data communication to the enterprise nucleus for facilitating the purchase of products. The system can include at least one content distribution network (CDN) and at least one advertising network, both of which are coupled in data communication to the enterprise nucleus.

The enterprise nucleus of the system further preferably includes a computer having at least a processor and a memory operably coupled to the processor, the memory being configured for storing a computer program executable by the processor, the computer program being configured for performing steps of receiving from one of said one or more e-commerce applications a request for at least one of media, products, and offers, and for transmitting said request to at least one of said CDN and said advertising network; receiving from said at least one of said CDN and said advertising network said at least one of media, products, and offers and for transmitting said at least one of media, products, and offers to said one of said one or more ecommerce applications; receiving from said one of said one or more e-commerce applications a registration ID and a purchase order, and for transmitting said registration ID and a purchase order to said e-commerce platform; and for receiving from said e-commerce platform transaction data relating to said registration ID and a purchase order, and for transmitting said transaction data to said one of said one or more e-commerce applications.

The present invention, accordingly, provides a method for presenting advertisements for commercial products in video productions, whereby the commercial product is placed in the video production as an element of the video production. A viewer is enabled to interact with the video production to select the product. Information is displayed about the selected product; and the viewer is enabled to purchase the selected product.

More specifically, the invention comprises a web-based rich media software application allowing non-technical end-users the ability to easily create full frame interactive media overlays into the video production which has been encoded with pre-defined cue points that request immersive full motion video interactive overlay elements from an ad-server.

The cue points are utilized to trigger pre-defined advertising events stored and indexed with metadata in an ad server or other database. By way of example, an advertising event may include the extraction of a single video frame or a series of frames of the encoded video production, which in turn becomes the interactive advertisement that is triggered by the pre-set cue point and presented to the user as a seamless advertising/entertainment experience.

Once the cue point triggers an event, the system calls the specific advertisement into the video player and seamlessly overlays the initial video production with the enhanced interactive product ads. The ad is displayed for a predetermined life cycle, such as 5-10 seconds. Once the life cycle of the ad expires, or the ad is clicked or presented to the end user, the advertisement will destroy itself, leaving the viewer with the impression that there was never a break in the viewing experience.

In conjunction with the integrated overlay advertisements, the process of the invention is supplemented with an information and product integrated timeline residing under the video production. At the triggered cue point, watermarked icons/logos appear under the video production. Users can interact with the icons to garner more information about a particular character, location, or advertisers at a specific point in the feature presentation, employing the same aforementioned calls.

BRIEF DESCRIPTION OF THE DRAWINGS

For a more complete understanding of the present invention, and the advantages thereof, reference is now made to the following descriptions taken in conjunction with the accompanying drawings, in which:

FIG. 2 and FIG. 3 exemplify an interface application wireframe utilizing standard embed code for calling into remote online destinations;

DETAILED DESCRIPTION

In the following discussion, numerous specific details are set forth to provide a thorough understanding of the present invention. However, it will be apparent to those skilled in the art that the present invention may be practiced without such specific details. In other instances, elements have been illustrated in schematic or block diagram form in order not to obscure the present invention in unnecessary detail. Additionally, for the most part, details concerning the Internet, HTML (including HTML5), HTTP, HTTPS, SWF, XML, PHP, ADOBE FLASH, FLV, and the like have been omitted inasmuch as such details are not considered necessary to obtain a complete understanding of the present invention, and are considered to be within the skills of persons of ordinary skill in the relevant art.

It is noted that, unless indicated otherwise, all functions described herein may be performed by a processor such as a microprocessor, a controller, a microcontroller, an application-specific integrated circuit (ASIC), an electronic data processor, a computer, or the like, in accordance with code, such as program code, software, integrated circuits, and/or the like that are coded to perform such functions. Furthermore, it is considered that the design, development, and implementation details of all such code would be apparent to a person having ordinary skill in the art based upon a review of the present description of the invention.

Figure 1:
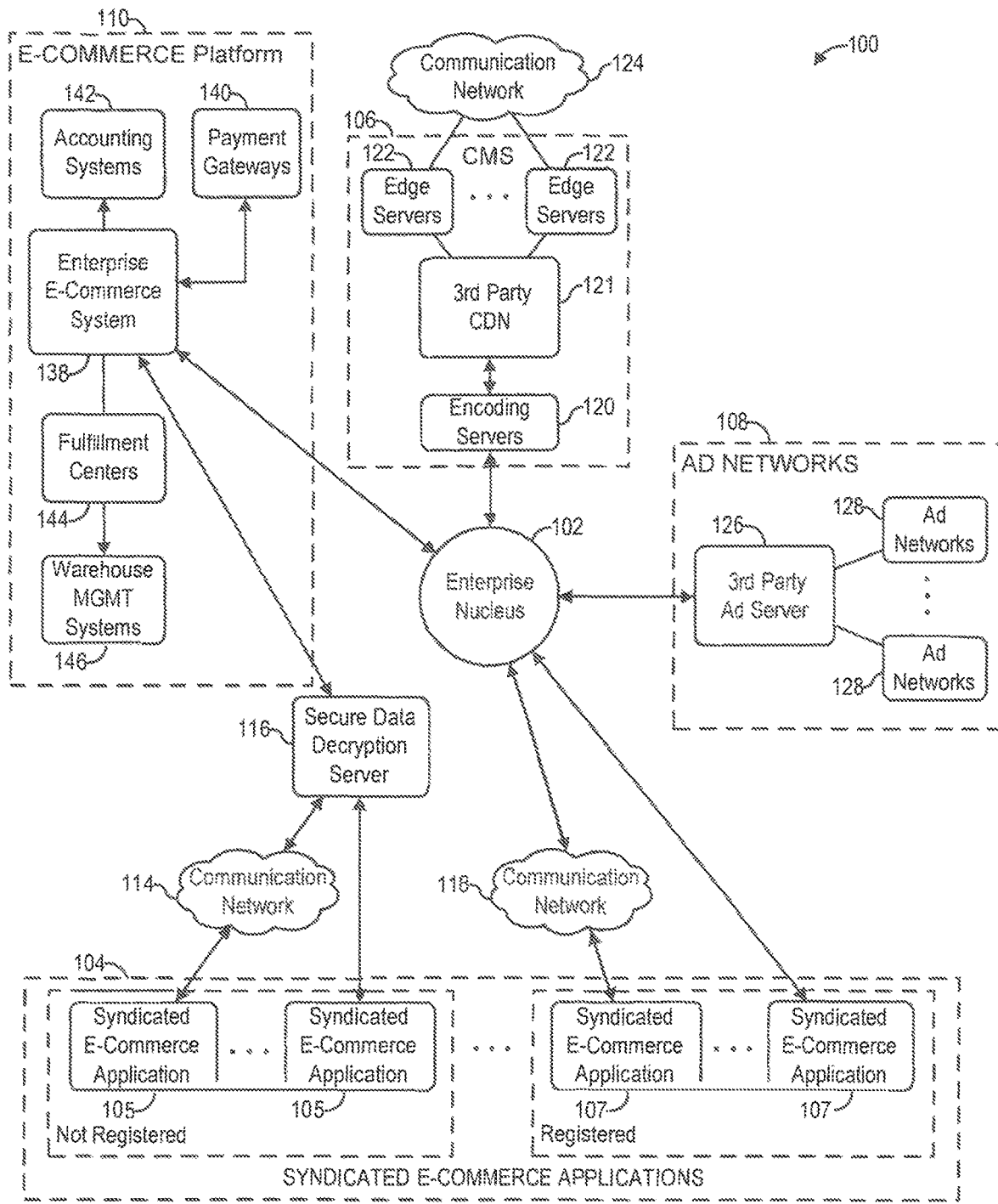
FIG. 1 is a high level block diagram exemplifying data flow in an interactive product placement system embodying features of the present invention.

Referring to FIG. 1 of the drawings, the reference numeral 100 generally designates an interactive content distribution system embodying features of the present invention. The system 100 includes an enterprise nucleus 102 configured as a hub for controlling all operations of the systems 100, discussed in further detail below. Coupled to the enterprise nucleus 102 are one or more syndicated e-commerce applications 104, a content management system ("CMS") 106, advertising networks 108, and an e-commerce platform 110.

The syndicated e-commerce applications 104 coupled to the enterprise nucleus 102 include e-commerce applications 105 in which the end-users are not registered with the e-commerce platform 110 and e-commerce applications 107 in which the end-users are registered with the e-commerce platform 110. The syndicated e-commerce applications 105 and 107 include, by way of example but not limitation, mobile device applications for mobile devices (e.g., IPHONE, smartphones running the Android operating system, portable gaming platforms such as NINTENDO DS), social media applications (e.g., FACEBOOK, MYSPACE, GOOGLE BUZZ), syndicated media player applications, syndicated store applications, applications written for game consoles (e.g., X-BOX, PLAYSTATION, NINTENDO, WII), Internet protocol television ("IPTV"), and any device and/or platform that would allow insertion of syndicated e-commerce applications and conduct the syndicated e-commerce process discussed below. Each of the unregistered e-commerce applications 105 are preferably coupled, either directly (e.g., cable, satellite, fiber optic) or via a communication network (e.g., the Internet, VPN, cellular communications network) 114, to a secure data decryption server ("SDDS") 116, which SDDS is in turn coupled to the e-commerce platform 110, described in further detail below. Each of the registered e-commerce applications 107 are preferably coupled, either directly or via a communication network (e.g., the Internet, cellular communications network) 116, to the enterprise nucleus 102.

The CMS 106 includes an encoding server 120 coupled to the enterprise nucleus 102 and to a third party content distribution network ("CDN") 121. The CDN 121 is preferably coupled to one or more edge servers 122, such as provided by Akamai, which provide an interface, via a communication network (e.g., the Internet) 124, between the CDN 124 and one or more content providers (not shown). Content provided by the CMS 106 includes, by way of example but not limitation, motion pictures, motion picture trailers, video, and audio.

The advertisement ("ad") networks 108 include a third-party advertisement server 126 (e.g., Ad-Tech) coupled to the enterprise nucleus 102, and one or more ad networks 128 (e.g., ADMOB, TREMOR MEDIA, and LC?). The ad networks 108 provide, by way of example but not limitation, products lists showing which products are associated or correlated with at least one item associated with or displayed in certain media, and other product information, such as pricing, availability, and the like.

The e-commerce platform 110 includes an enterprise e-commerce system 138 coupled to the enterprise nucleus 102. One or more payment gateways 140 (e.g., PAYPAL), accounting systems 142, and fulfillment centers 144 are coupled to the enterprise e-commerce system 138. One or more warehouse management systems 146 are connected to each fulfillment center 144. The enterprise e-commerce system 138 is further preferably coupled to the SDDS 116 for receiving registration application data from the e-commerce application 105.

Figure 2:
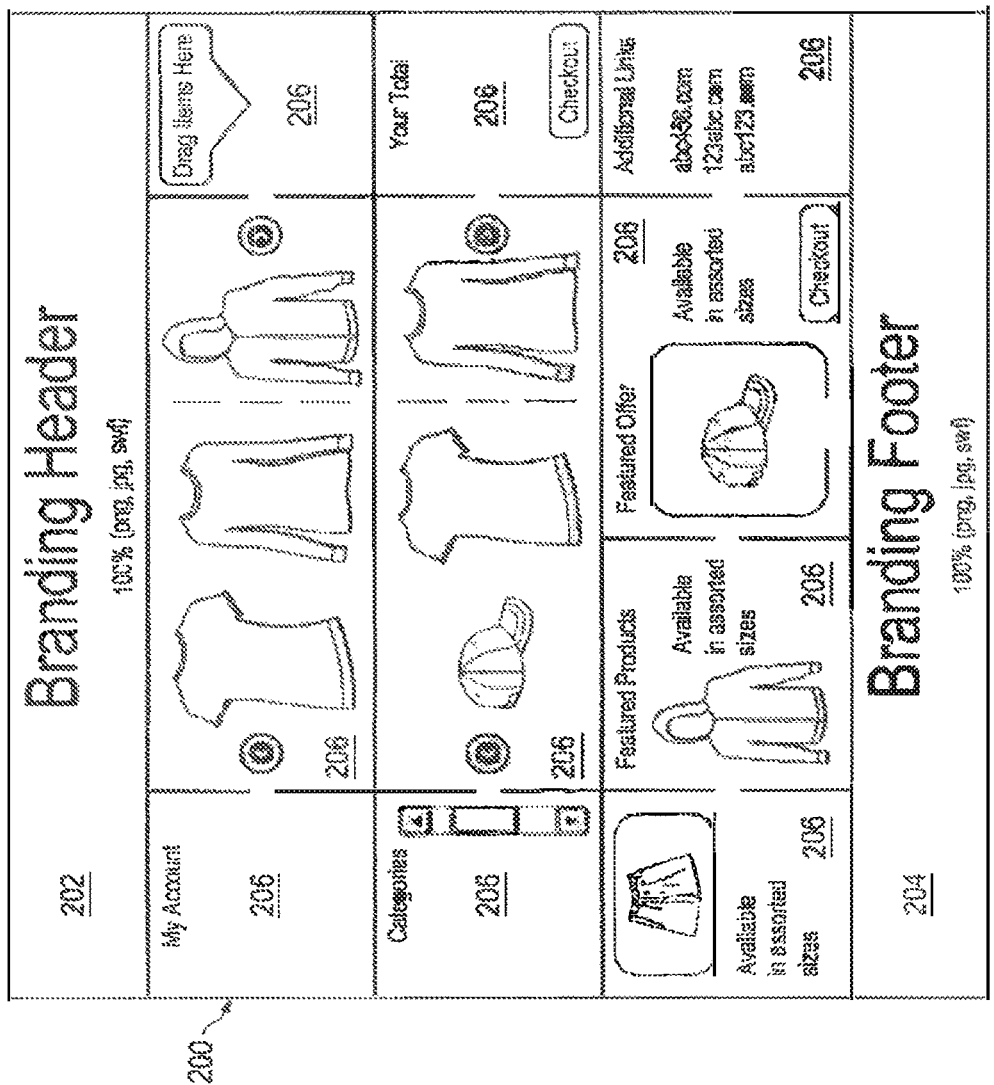

FIG. 2 exemplifies a player frame 200 embodying features of the invention. The frame 200 preferably includes a header 202 and footer 204, as well as a number of sub-frames 206 sandwiched between the header and footer. The sub-frames 206 may be configured for displaying account information, categories, products, featured products, featured offer, a shopping cart, total charges, and additional links (e.g., About Us, Shipping, Returns, Privacy & Security, Conditions of Use, Contact Info, Gift Voucher FAQ).

FIG. 3 exemplifies an alternate embodiment of player frame with video content, advertisements, and an e-commerce component overlaid on the player frame, along with viral tools.

Figure 4:
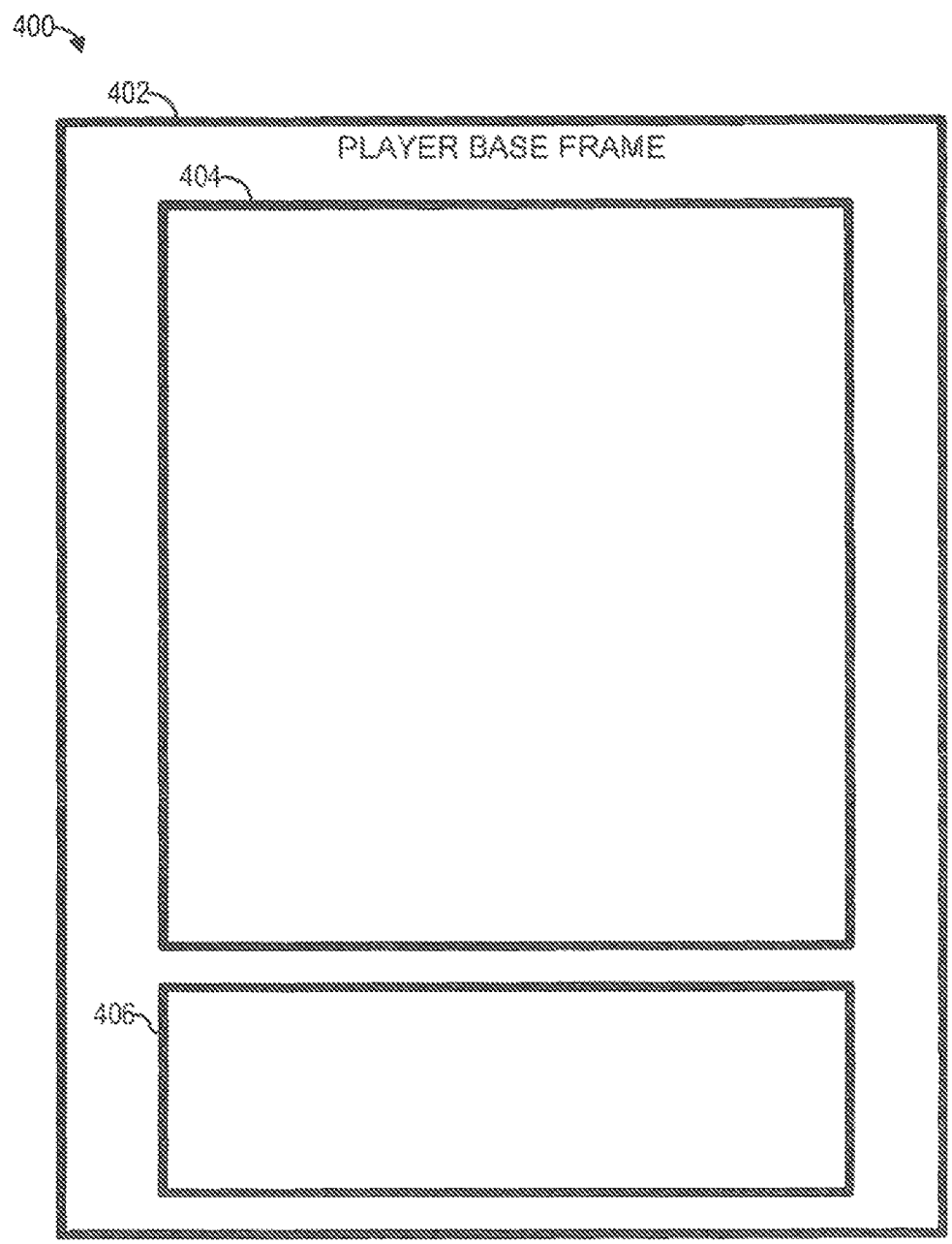
FIG. 4 exemplifies a syndicated e-commerce interface application wireframe utilizing standard embed code into remote online destinations.

FIG. 4 exemplifies a player base frame 400 having an main frame 402, subframe 404 configured for a video production (not part of the base frame), and a subframe 406 configured for an e-commerce application (not part of the base frame). The player base frame 400 also includes embed code (not shown), such as HTML code, for retrieving media content from the CMS 106, ad content and a product list from the ad networks 108, and an e-commerce component of the player from the enterprise nucleus 102, as discussed in further detail below.

The player base frame 400, with the embed code for retrieving media content, ad content, and an e-commerce component, may be virally copied and propagated from one web page to any number of other web pages on the Internet.

Figure 5:
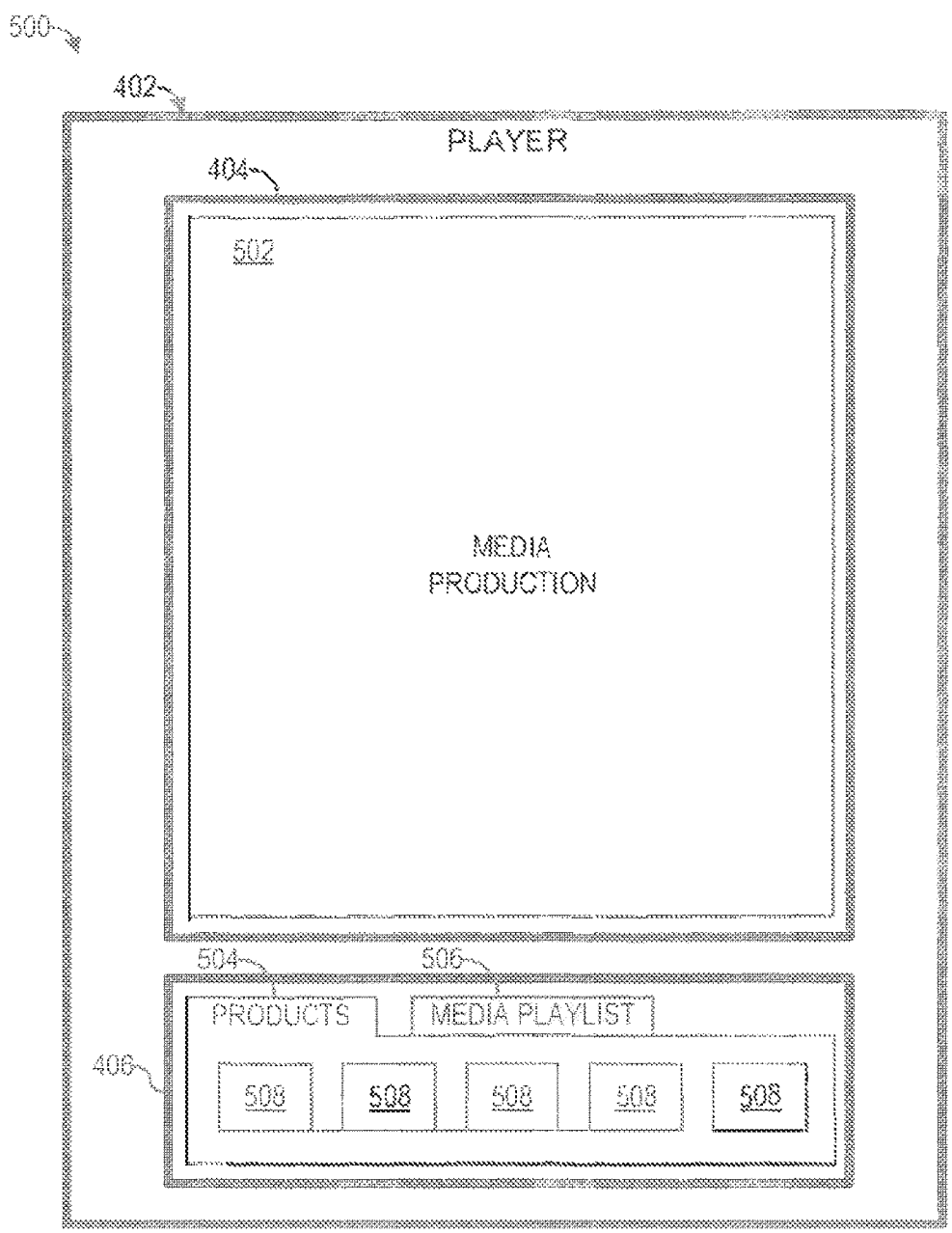
FIG. 5 and FIG. 6 exemplify an implementation embodiment of a syndicated e-commerce interface application wireframe for implementing features of the invention.
Figure 6:
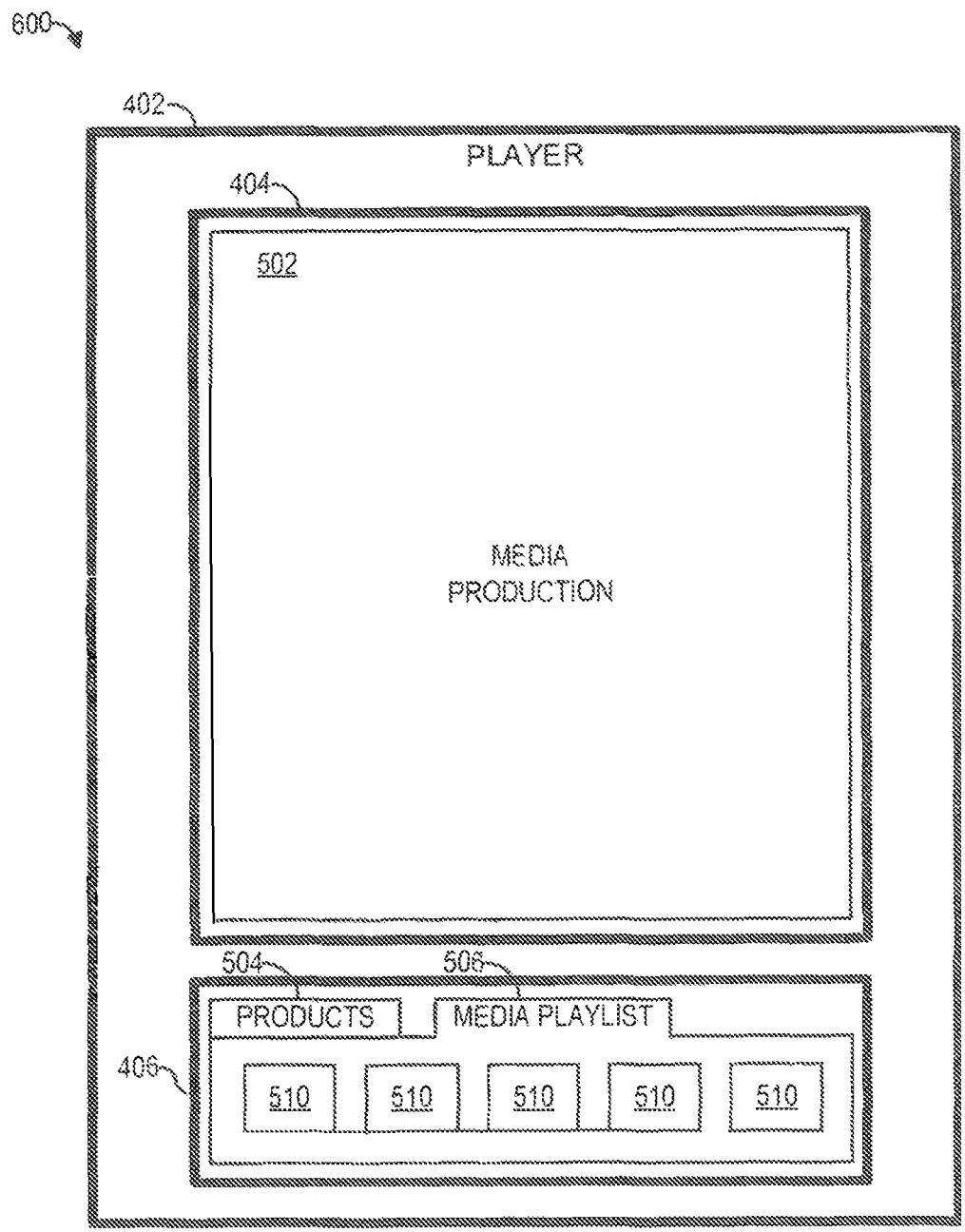

FIG. 5 and FIG. 6 exemplify a player 500 built on the player base frame of FIG. 4. as it would be displayed, for example, on a computer monitor (not shown). The player 500 preferably includes media content (e.g., video, motion picture, audio) 502 presented within the subframe 404 (using, e.g., FLASH encoding) and a syndicated e-commerce component in the subframe 504. The e-commerce component is configured to be an interface between a user and the e-commerce platform 110 and the SDDS 116 (discussed below with respect to steps 714-738 of FIG. 7), and is preferably built on custom encoding, and preferably includes a product list 504 (FIG. 5) and a media play list 506 (FIG. 6) integrated therein for use by a user. The product list 504 preferably displays products 508 that correspond to products being used in the media production 502, which products which may be selected for purchase through the interactive ecommerce component in the subframe 504. The media play list 506 preferably displays a number of media from which a user may select to view or listen to in the media production 502.

Figure 7:
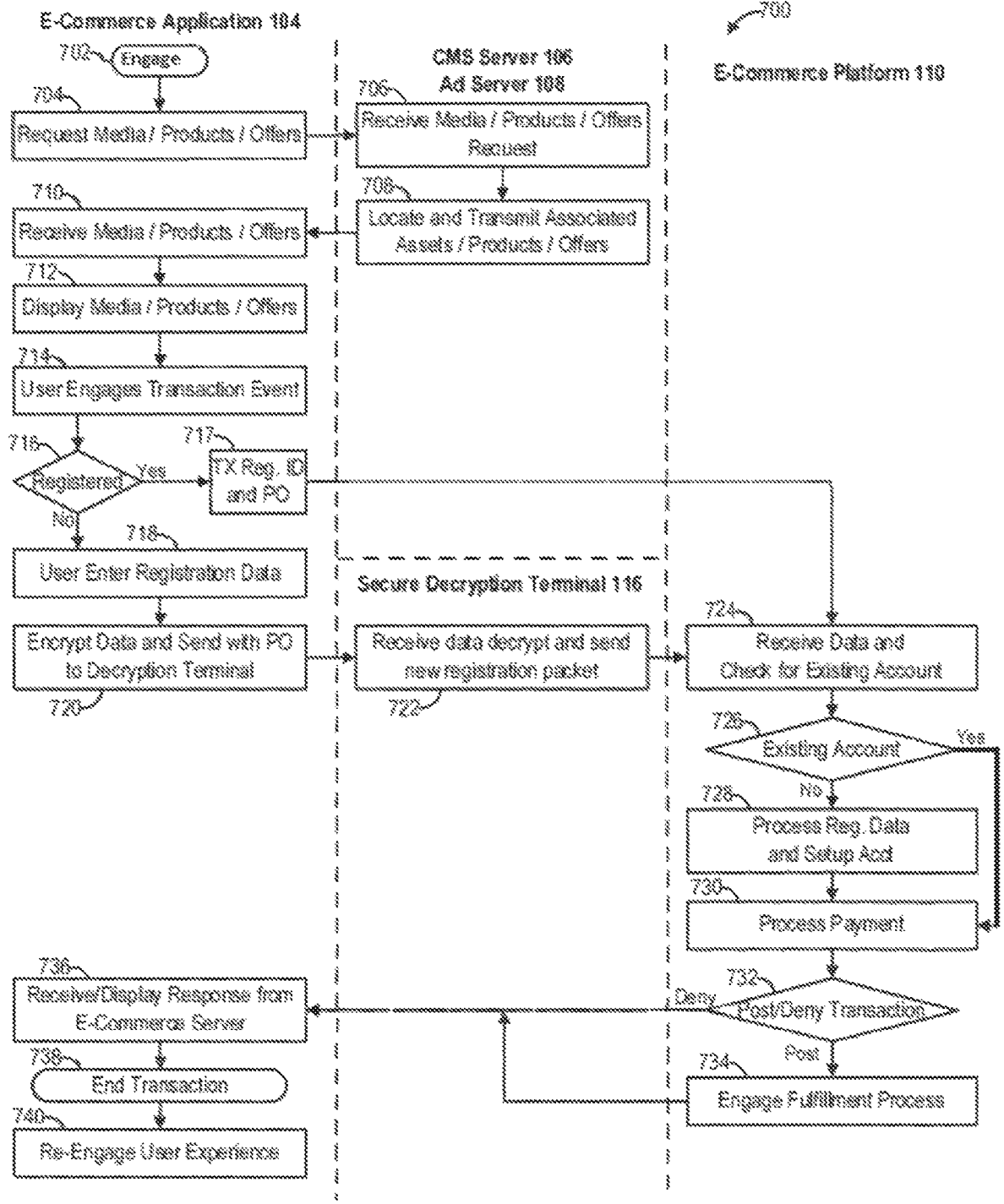
FIG. 7 is a flow chart exemplifying logic utilized in the invention.

FIG. 7 depicts a flow chart 700 exemplifying one preferred embodiment for using the invention. In step 702, a user engages an e-commerce application 104, and in step 704, a user requests (e.g., via the media play list 506) media content (e.g., video, audio, game) with which to be presented. The e-commerce application 104 then generates a request for same along with associated products and product offers, and transmits the request to the enterprise nucleus 102 which forwards same to the CMS server 106 and ad server 108. In step 706, the CMS server 106 retrieves the requested media content and the ad server 108 retrieves ad content (i.e., products and product offers) associated with the media content. In step 708, the requested media content along with associated ad content is transmitted to the e-commerce application 104, and in step 710, same is received by the e-commerce application. In step 712, the media content is presented for display to the user via the media production window 502, and associated ad content is presented in the sub-frame 406.

While viewing the media content, if a user/viewer should see an item or product that the user/viewer would find desirable to have, then in step 714, the user/viewer may engage the e-commerce component 504 to place an order for the product. In step 716, a determination is made whether the user is registered with the e-commerce platform to order the product. If it is determined at step 716 that the user is registered, then execution proceeds to step 717 in which the e-commerce application 104 generates a message comprising the user's registration data and purchase order and forwards same to the e-commerce platform 110. If it is determined at step 716 that the user is not registered, then execution proceeds to step 718 in which the user is prompted to provide information to become registered to purchase the product. In step 720, the user's registration application data is encrypted and transmitted to a secure data decryption server (SDDS), and in step 722, the encrypted data is decrypted and forwarded to the e-commerce platform 110.

At step 724, the e-commerce platform receives the registration data and checks to determine whether the user has an existing account. In step 726, if the user has an existing account, then execution proceeds to step 730; otherwise, execution proceeds to step 728. At step 728, the registration application data is processed and an account is setup in the name of the user, and execution proceeds to step 730. At step 730, payment for the product to be purchased is processed, and at step 732, a determination is made whether to post or deny the transaction. If the transaction is denied, a report of same is transmitted to the e-commerce application 104. If the transaction is posted, then in step 734 the fulfillment center 144 in conjunction with the warehouse management system 146 is instructed to fill the order and a report of same is transmitted to the e-commerce application 104.

In step 736, the e-commerce application 104 receives the report that the transaction was either denied or posted and presents same to the user, and the transaction is terminated at step 738. At step 740, the user resumes viewing or listening to the media content.

Figure 8:
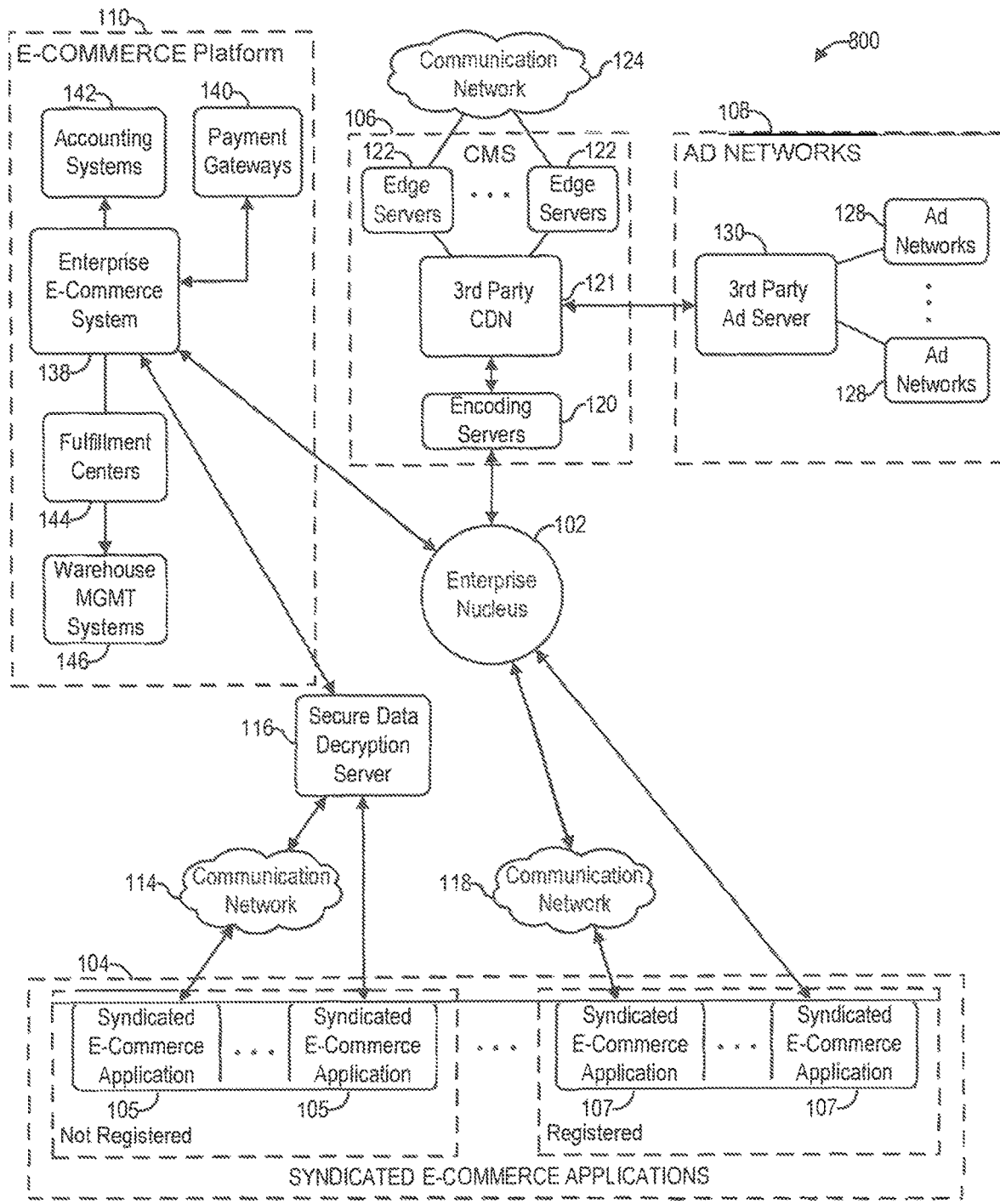
FIGS. 8-10 exemplify alternate embodiments of the system of FIG. 1.
Figure 9:
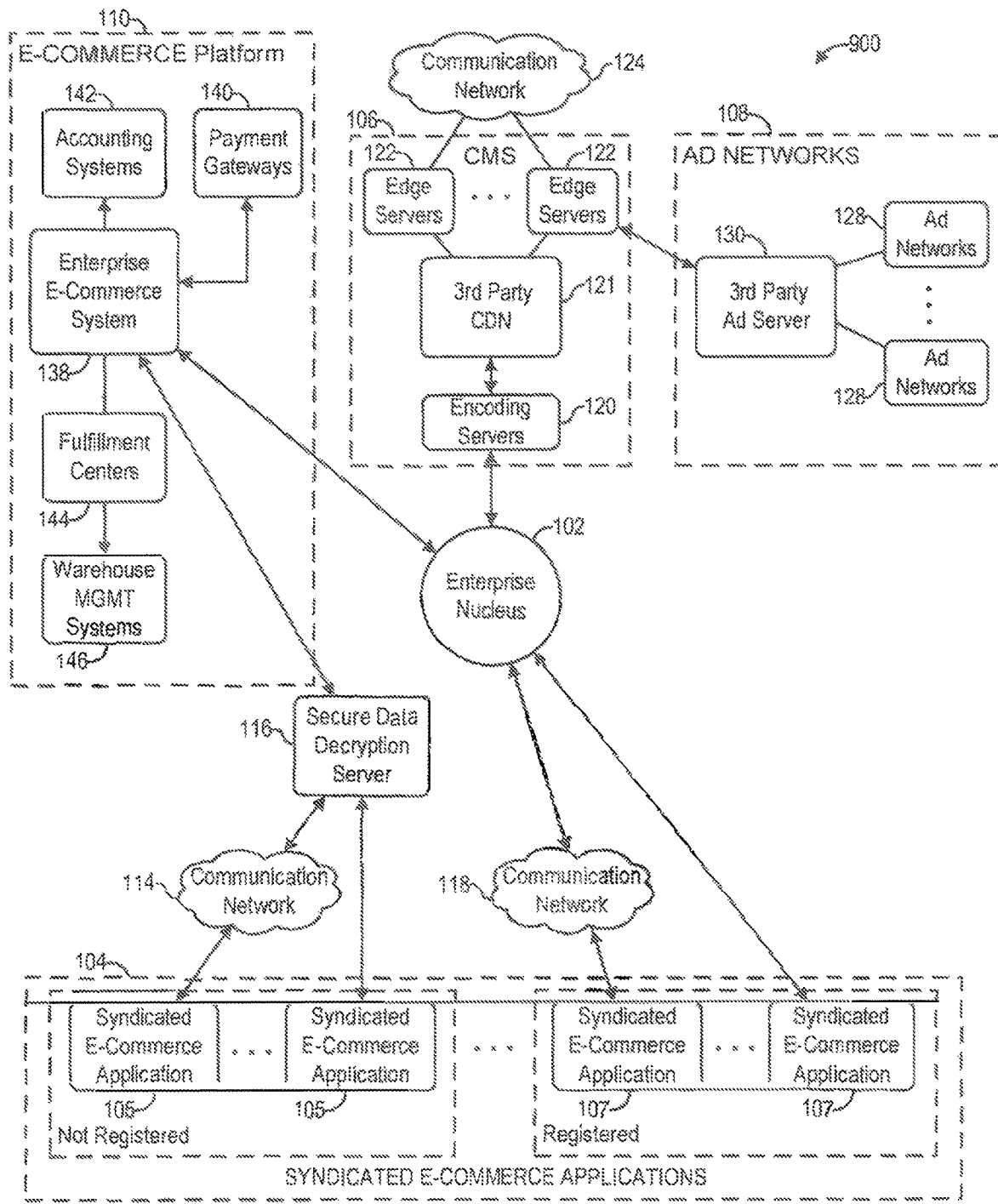
Figure 10:
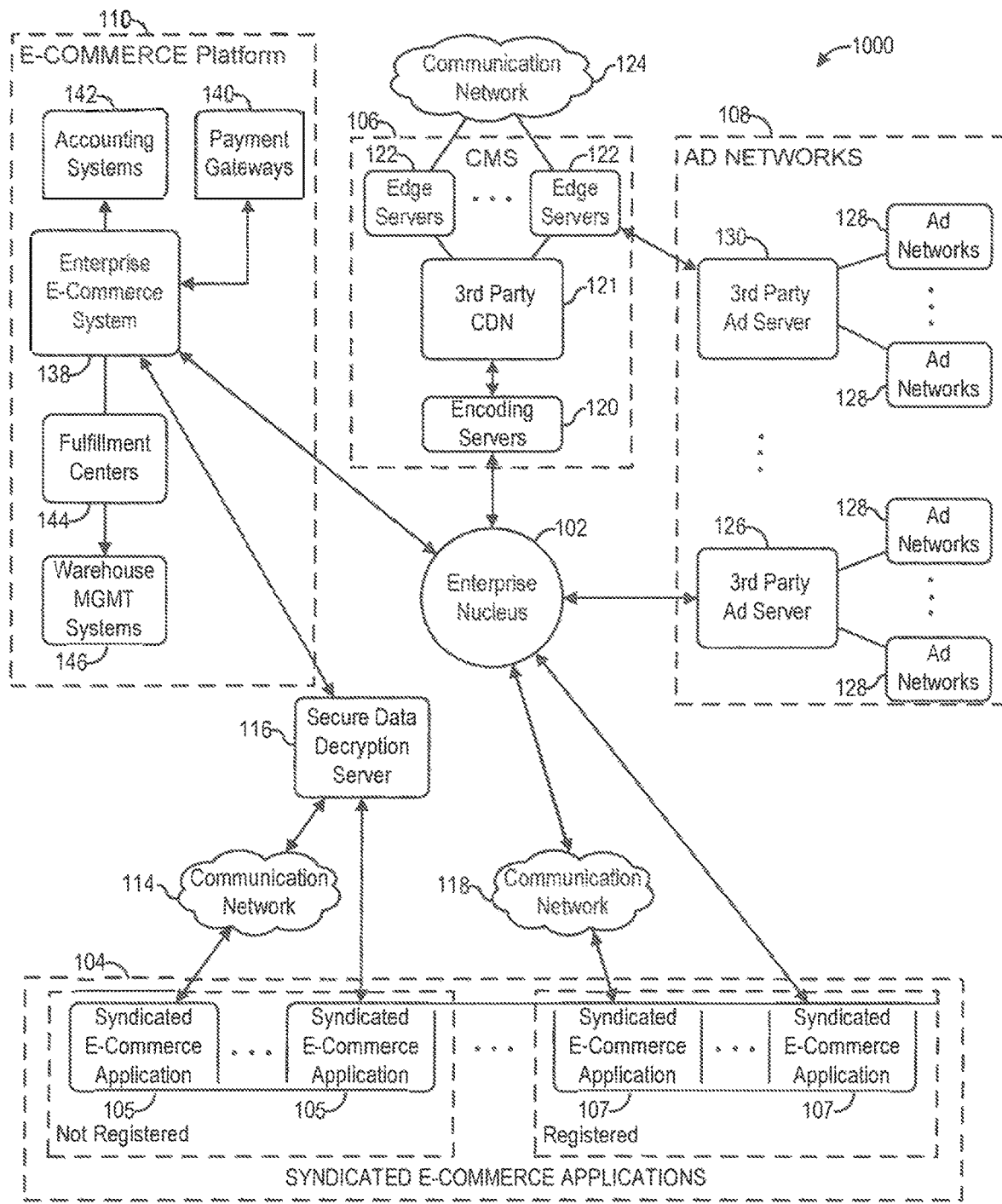

It is understood that the present invention may take many forms and embodiments. Accordingly, several variations may be made in the foregoing without departing from the spirit or the scope of the invention. For example, FIG. 8 shows a system 800 in which the third party ad server 130 may be coupled directly to the third party CDN; FIG. 9 shows a system 900 in which the third party ad server 130 may be coupled directly to the CMS edge servers 122; and FIG. 10 shows a system 1000 in which the third party ad server 130 may be coupled in any combination of ways depicted by FIGS. 1, 8, and 9, and in particular, directly to the enterprise nucleus 102 and CMS edge servers 122.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

In the following discussion, numerous specific details are set forth to provide a thorough understanding of the present invention. However, it will be obvious to those skilled in the art that the present invention may be practiced without such specific details. In other instances, well-known elements have been illustrated in schematic or block diagram form in order not to obscure the present invention in unnecessary detail. Additionally, for the most part, details concerning the Internet, HTTP, XML, PHP, FLV, and the like have been omitted inasmuch as such details are not considered necessary to obtain a complete understanding of the present invention, and are considered to be within the skills of persons of ordinary skill in the relevant art.

It is noted that, unless indicated otherwise, all functions described herein may be performed by a processor such as a microprocessor, a controller, a microcontroller, an application-specific integrated circuit (ASIC), an electronic data processor, a computer, or the like, in accordance with code, such as program code, software, integrated circuits, and/or the like that are coded to perform such functions. Furthermore, it is considered that the design, development, and implementation details of all such code would be apparent to a person having ordinary skill in the art based upon a review of the present description of the invention.

Figure 11:
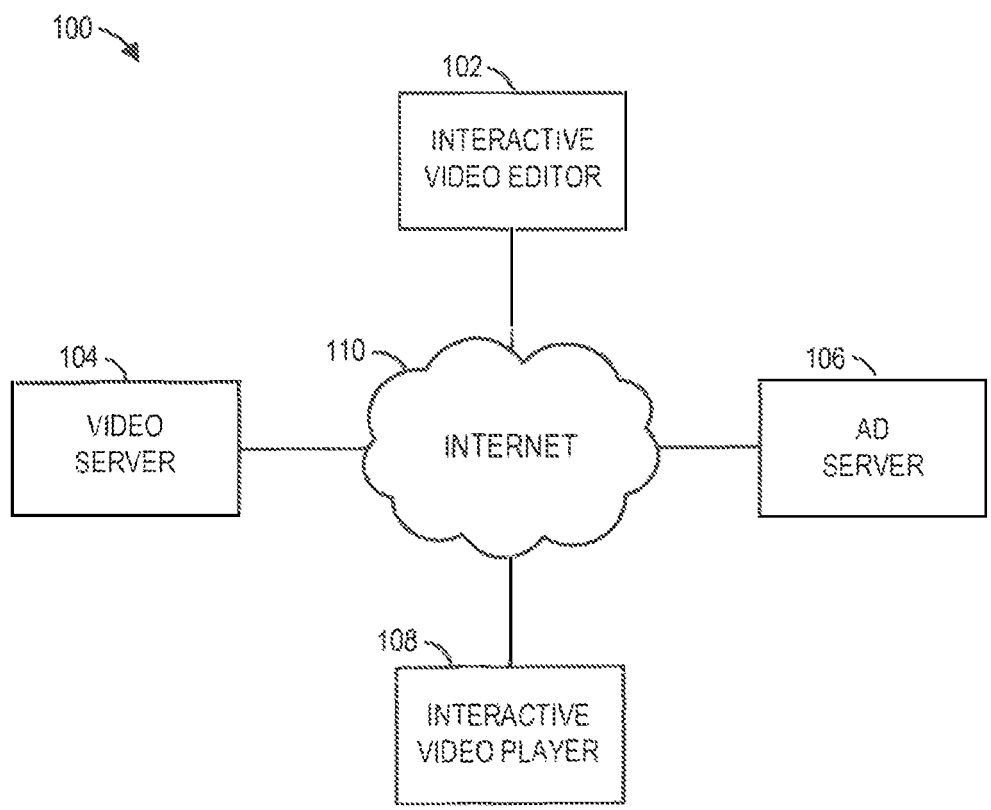
FIG. 11 is a high level block diagram of an interactive product placement system embodying features of the present invention.

Referring to FIG. 11 of the drawings, the reference numeral 100 generally designates an interactive product placement system embodying features of the present invention.

The system 100 includes a video server 104 and an ad (i.e., "advertisement") server 106 coupled together via a communication information network effective for video streaming, such as the Internet, 110. An interactive video editor 102 is coupled via the Internet 110 to the video server 104 and ad server 106 for creating immersive interactive advertisements in conjunction with video productions displayed by the video server. An interactive video player 108 is coupled via the Internet 110 to the video server 104 and ad server 106 for displaying video productions from the video server 104 and ads from the ad server 106 in accordance with principles of the present invention.

Figure 13:
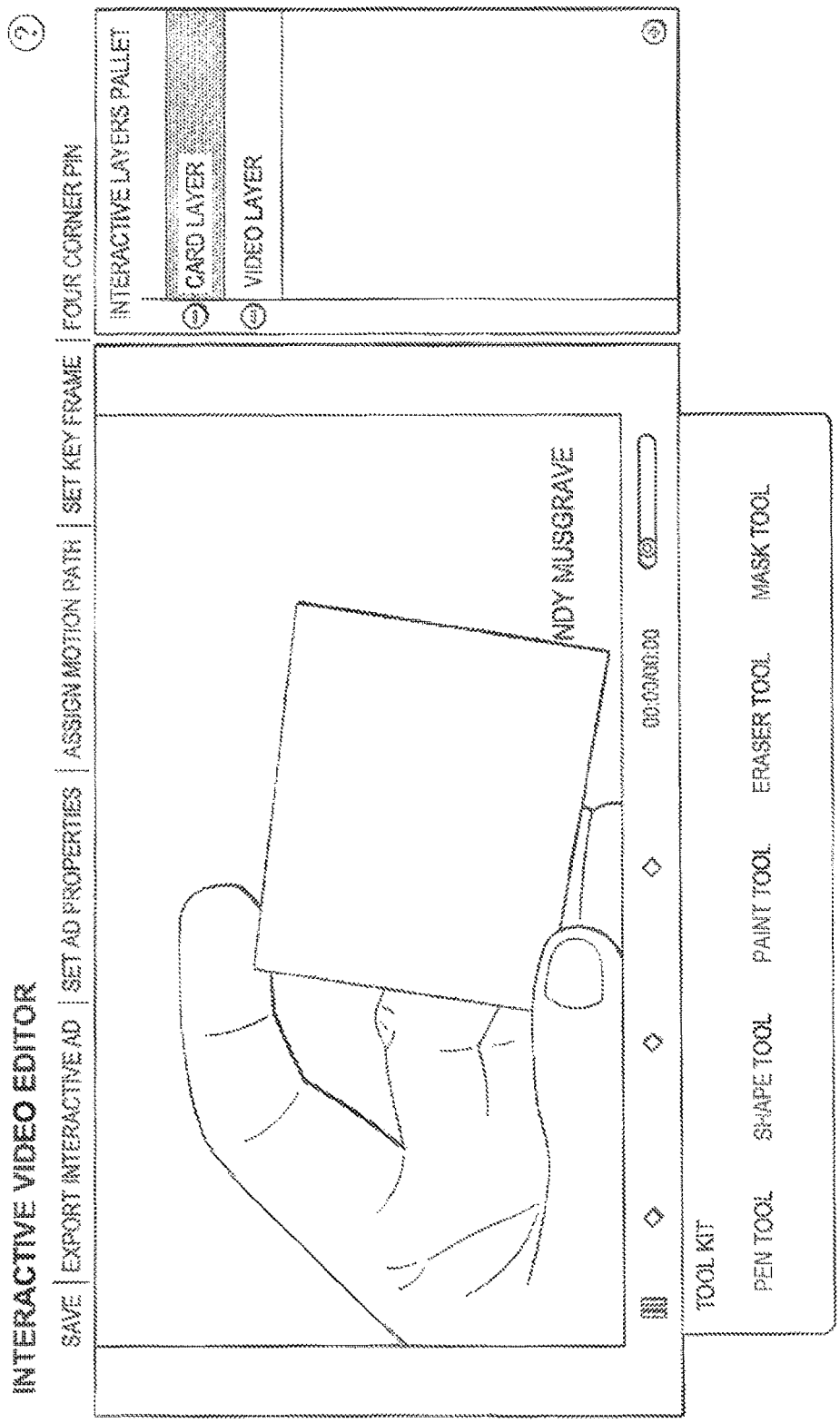
FIG. 13 exemplifies an application of an interactive video editor embodying features of the present invention.

FIG. 13 exemplifies an application of the interactive video editor 102 for enabling non-technical ad representatives to create an immersive interactive advertising experience for users. The editor 102 defines the properties, interactive elements, visuals, and motion of the ad element stored in metadata and XML, format and packaged with the ad file. The editor 102 is a rich media application comprising tools, a user interface, and backend connections to the ad server 106. The following lists, by way of example and not limitation, some preferred features of the editor 102:

File: Open

Save: Save an iteration of video project file.

Export: Export in all applicable compiled final production ready formats.

Properties: Set campaign name, lifespan and essential metadata ad formats.

Assign Path: Create guideline to animate overlay object end to end over.

Set Key: Assign animation key frame.

Four Corner Pin: Pin vector points to set start and end frames over underlying video production. Corner Pin effect distorts an image by repositioning each of its four corners. Use it to stretch, shrink, skew, or twist an image or to simulate perspective or movement that pivots from the edge of a layer The interactive video editor 102 also enables layers to be added to the video production. More specifically, an overlay element allows users to see an underlying video preview. The first layer on the bottom forms a base layer, and anything layered on top of that at least partially obscures the layers underneath it.

Still further, the interactive video editor 102 includes a tool kit, comprising the following:

Pen: freeform drawing tool used to define shape

Shape: Set of predefined shapes to use as interactive element

Paint: Brush tool allowing more freeform element creation

Erase: Remove excess erase tool allows you to remove portions of shapes or lines with precision. You can change the size and shape of the eraser as well as the portions of any shape you want to erase by adjusting the options FIG. 14 exemplifies an application of the interactive video player 108 configured with the capabilities to read, display, and interact with code supplied by the corresponding application of the interactive video editor 102. The player 108 is a rich media application comprising tools, a user interface, and backend connections to the ad server 106.

Figure 14:
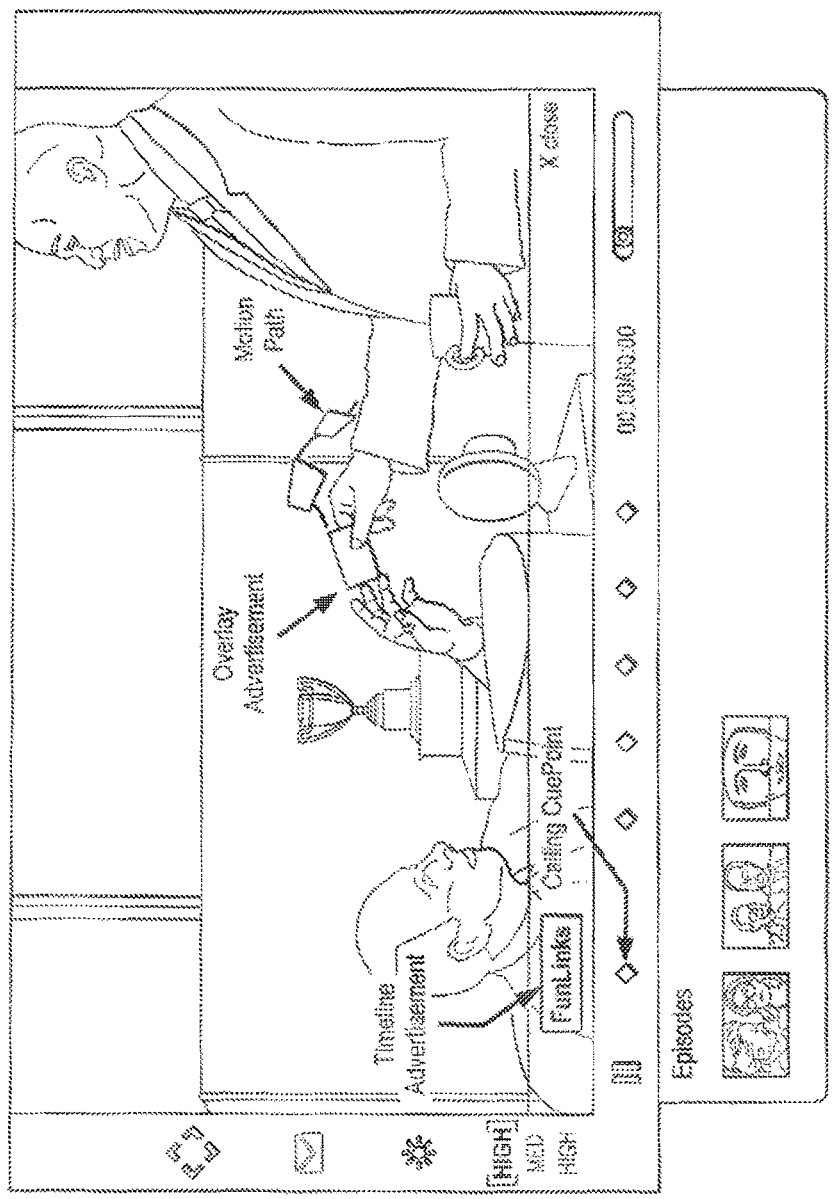
FIG. 14 exemplifies an application of an interactive video player embodying features of the present invention.

As shown in FIG. 14, the video player 108 advertises a card in an overlay as it moves along a motion path. Also shown are an ad icon/logo for the card in a Timeline under the video display, and under the ad icon/logo, a calling cue point corresponding to a respective icon/logo above it. Optionally, under the calling cue points are episodes of the video production being watched. While the timeline is shown positioned beneath the video production, it may be positioned along the top, left, or right margins of the video production.

Figure 12:
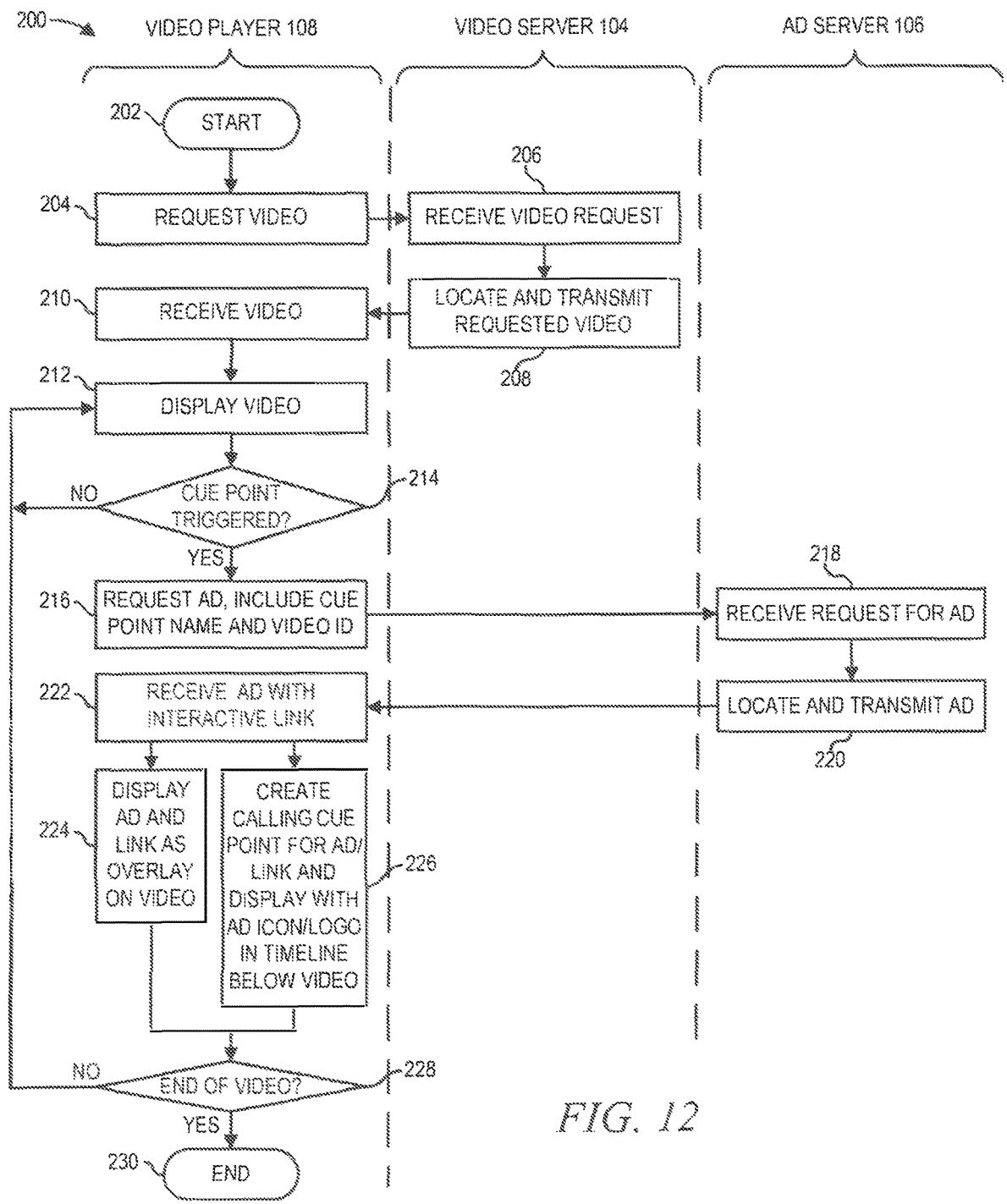
FIG. 12 exemplifies a flow chart illustrating control logic for implementing features of the system of FIG. 11.

FIG. 12 is a flow chart exemplifying steps in the operation of the invention. In step 202 operation begins, and in step 204 a request is generated by the video player 108 (per input from a user) for a video production and transmitted to the video server 104. In step 206, the video server 104 receives the request for a video production and, in step 208, the video server 104 locates the video production and transmits it to the video player 108. In step 212, the video player 108 begins playing the video production until a cue point is triggered in step 214. Upon triggering the cue point, execution proceeds to step 216 wherein the video player generates and transmits to the ad server 106 a request via HTTP POST requests for an ad, and includes with the request a cue point name and video ID into which the ad will be placed. The following exemplifies a request generated at step 216:

```
FLVPlayback.addEventlistener(Video.CuePoint, function( ) {
  Var request = new
URLRequest("filename.php?func=advertisment&movie_id="+movie_id+"&cue_point="
+ this.cuePointName);
}
```

In step 218, the ad server 106 receives the ad request and, in step 220, the ad server 106 locates the requested ad and transmits the ad to the video player 108. The ad requests are made form the player application via HTTP POST requests. The response from the ad server or other database will be a small XML, that gives the path of the ad, length, and any other information that's related to the ad. The player reacts to events signaled by the cue points request and will execute actions defined inside the event trigger instructing the player with the ad parameters, e.g., kind of ad file requested, the action to take, e.g., pause, lifespan, effect, specifics coordinates of the over-laid ad, and the like, as well as any other custom defined configurations.

The following exemplifies simple cue point metadata, which is generated by the video editor 102 and stored with the advertisement:

| TIME | CUE POINT NAME | ACTION | DURATION | URL PATH |
|---|---|---|---|---|
| 1:54.02 | soda_can | Fade In | 10 sec. | http://yoururl.com/ad |
| 2:02.06 | pizza_box | Motion Path | 10 sec. | http://yoururl.com/ad |
| 9:02.04 | sneakers | Glow | 5 sec. | http://yoururl.com/ad |

In step 222, the video player receives the ad with an interactive link which a user/viewer may select and click on to obtain further information about the product being advertised, and optionally purchase same. The ad is then displayed as either or both an ad with the link as an overlay on the video production in step 224, or in step 226 as a calling cue point for the ad and link in an icon or logo in a timeline below the video production. In step 224, the ad is displayed for the duration indicated in the cue point data, as exemplified above. The icon or logo in the timeline of step 226 may remain in the timeline as long as space permits, that is, until space is needed for a icon or logo of a subsequent icon or logo.

In step 228, a determination is made whether the video production is complete. If the video production is not complete, execution returns to step 212; otherwise, execution is terminated as step 230.

Figure 15:
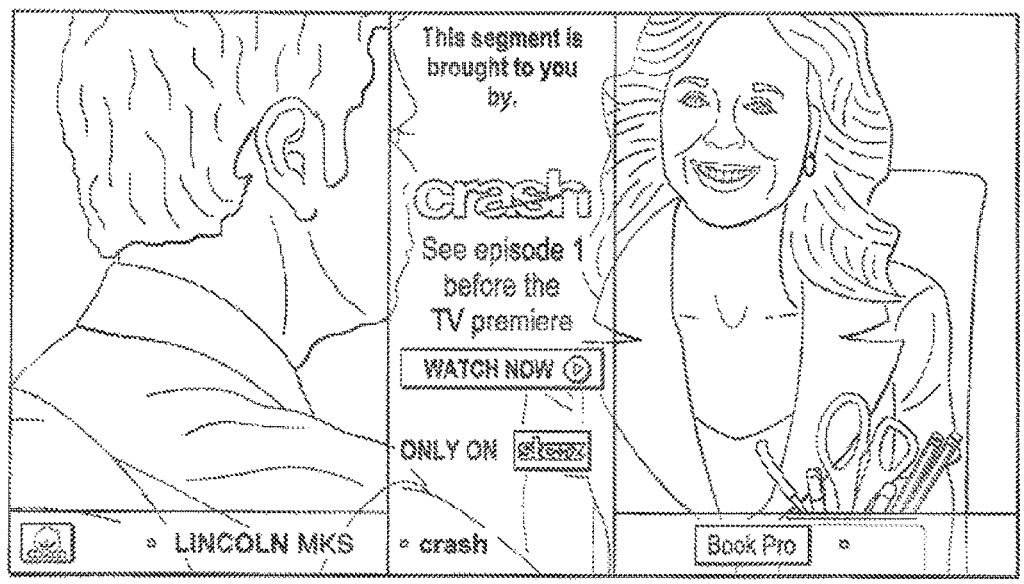
FIG. 15 exemplifies a product placement timeline embodying features of the present invention.
Figure 16:
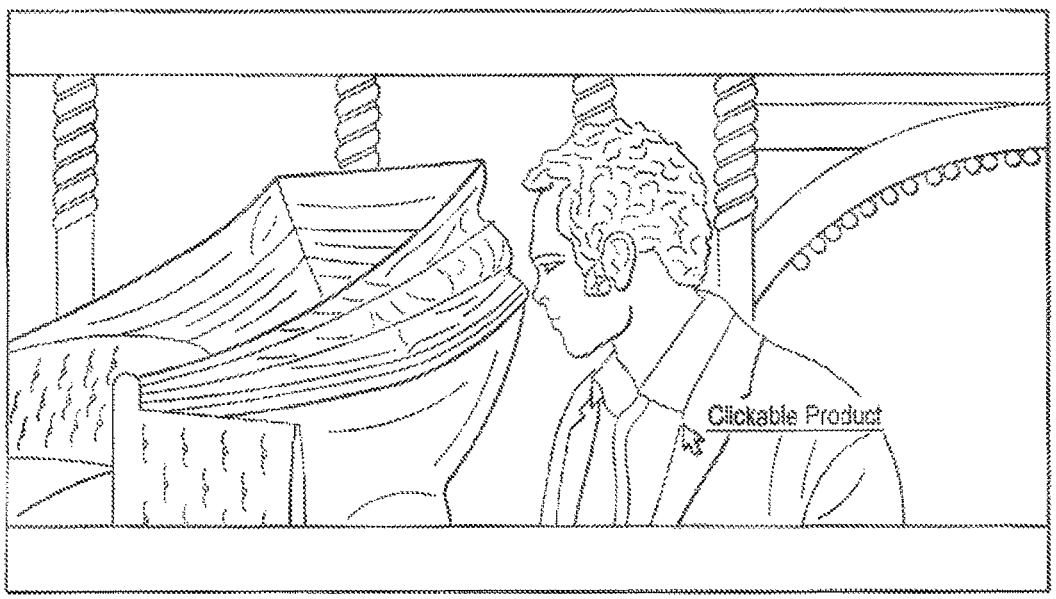
FIG. 16 exemplifies an interactive product placement embodying features of the present invention.

FIGS. 15 and 16 provide additional visual examples of interactive overlay and timeline ads, in which the video player 108 seeks cue points set in the video content triggering an ad event requesting either a timeline advertisement or an embedded live overlay advertisement. More specifically, FIG. 15 exemplifies how timeline information and advertisement offers directly correspond to cue points inside specific video content assets. FIG. 6 exemplifies how cue points trigger pre-defined advertising events stored and indexed with metadata in the ad server or other database. An example of the event may include the extraction of a single video frame or a series of frames of a video production, which in turn becomes the interactive advertisement that is laid over the video production to create a seamless interactive clickable video ad. As shown in FIG. 16, the product being advertised is highlight via rotoscoping, and additional information may be obtained about by clicking on the product.

By the use of the present invention, an improved method is provided for advertising products by interactively placing them either in a timeline or embedding them in a live overlay on a video production.

It is understood that the present invention may take many forms and embodiments. Accordingly, several variations may be made in the foregoing without departing from the spirit or the scope of the invention. For example, the compositing of elements otherwise non-existing into the finished advertising product or filming green screen products and services into the production to later composite via the video editing application. Means for interconnecting components of the system may be achieved other than via the Internet, such as via fiber optic or cable network or satellite. The video stream may be supplied by alternative means incorporating, for example, DVD technology.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

The invention claimed is:

1. A processor-implemented method, comprising:
generating a user interface configured to include a first sub-frame defined to present a base media and a second sub-frame defined to present supplemental material associated with the base media;
defining a first cue point associated with a first portion of the base media and a second cue point associated with a second portion of the base media, each of the first cue point and the second cue point including cue point metadata that (1) identifies a start point at which supplemental material is to be presented to a user during a presentation of the base media and (2) includes a pointer to the supplemental material;
presenting the base media in a first subframe;
displaying a first icon that represents at least one of a first product or a first service featured in the first portion of the base media based on the first cue point being reached during presentation of the base media, the first icon configured to provide supplemental material associated with the at least one of the first product or the first service; and
displaying a second icon representing at least one of a second product or a second service featured in the second portion of the base media based on the second cue point being reached during presentation of the base media, the second icon configured to provide supplemental material associated with the at least one of the second product or the second service.

2. The processor-implemented method of claim 1, wherein:
the first cue point metadata includes an indication of a duration such that the first icon is displayed for the duration.

3. The processor-implemented method of claim 1, wherein:
the first icon is configured to be selected to provide the supplemental material.

4. The processor-implemented method of claim 1, wherein:
the first icon represents the supplemental material.

5. The processor-implemented method of claim 1, wherein the user interface is configured such that, by default, the second sub-frame is in a collapsed form in which the second subframe is not visible, the user interface including a user-interactive control tool configured to receive an indication of a user request to visualize the second subframe, and in response to the user request, transition the second sub-frame from the collapsed form to an expanded form in which the second sub-frame is visible.

6. The processor-implemented method of claim 1, wherein the first icon is displayed in the second subframe when the second sub-frame is in an expanded form.

7. The processor-implemented method of claim 1, wherein the first icon is displayed in the first subframe, the first icon being overlayed on a portion of the base media.

8. The processor-implemented method of claim 1, further comprising:
displaying a calling cue point in a media timeline associated with the presentation of the base media, the calling cue point configured to persist during the presentation of the base media;
receiving an indication of a user interaction with the calling cue point; and
presenting the supplemental material in response to the indication of the user interaction with the calling cue point.

9. The processor-implemented method of claim 1, further comprising:
displaying a calling cue point associated with the first cue point in a media timeline associated with the presentation of the base media, the calling cue point configured to persist during the presentation of the base media; and
receiving an indication of a user interaction with the calling cue point; and
displaying the first icon in response to receiving the indication of the user interaction with the calling cue point.

10. The processor-implemented method of claim 1, wherein the presenting the base media causes the calling cue point to be displayed in a media timeline associated with the presentation of the base media, the calling cue point being displayed at a location that is based on the start point at which the first icon is to be presented.

11. A non-transitory computer readable medium comprising instructions, the instructions when executed causing at least one processing device to:
initiate a presentation of a base media via a user interface;
display, via the user interface, a media timeline associated with the presentation of the base media;
display a calling cue point in the media timeline, the calling cue point being a visual indication associated with a cue point that persists during the presentation of the base media indicating a time point in the presentation that is associated with presentation of supplemental material;
receive an indication of a user interaction with the calling cue point; and
display the icon in response to receiving the indication of the user interaction with the calling cue point, the icon representing at least one of a product or a service featured in the base media and the icon configured to provide supplemental material associated with the at least one of the product or the service.

12. The non-transitory computer readable medium of claim 11, wherein the user interface includes a sub-frame configured to present the base media, the icon displayed in a portion of the sub-frame such that the icon overlays a portion of the base media, the icon being user interactive, the instructions when executed further causing the at least one processing device to:
receive an indication of a user interaction with the icon; and
presenting the supplemental material in response to receiving the indication of the user interaction with the icon.

13. The non-transitory computer readable medium of claim 11, wherein the user interface includes a sub-frame configured to present the base media, the icon displayed in a portion of the sub-frame such that the icon overlays a portion of the base media, the icon being user interactive, the instructions when executed further causing the at least one processing device to:
receive an indication of a user interaction with the icon; and
direct the user to a web source of the supplemental material, different from the user interface, in response to receiving the user input.

14. The non-transitory computer readable medium of claim 11, wherein the user interface includes a first sub-frame and a second sub-frame, and the base media is presented in the first sub-frame, the instructions when executed further causing the at least one processing device to:
define the second sub-frame in a collapsed form such that the second sub-frame is not visible;
present a user with an interactive tool configured to cause the processing device to receive user input indicating a request to view the second sub-frame;
transition the second sub-frame from the collapsed form to an expanded form in which the second sub-frame is visible in response to receiving the user input;
display the icon in the second sub-frame and in response to receiving the indication of the user interaction with the calling cue point, the icon representing the at least one of the product or the service, the product or the service being featured in at least a portion of the base media, the icon configured to cause the processing device to provide supplemental material associated with the product or the service.

15. The non-transitory computer readable medium of claim 14, wherein the calling cue point is associated with metadata that includes a duration of presentation of the icon, the instructions further comprising instructions that when executed cause the at least one processing device to:
display the icon for the duration indicated in the cue point metadata, in response to the receiving the indication of the user interaction with the calling cue point.

16. The non-transitory computer readable medium of claim 11, wherein the icon is user interactive, the instructions further comprising instructions that when executed cause the at least one processing device to:
receive an indication of a user interaction with the icon; and
present, in response to the indication of the user interaction with the icon, supplemental material associated with the product or service.

17. The non-transitory computer readable medium of claim 16, wherein the supplemental material includes an e-commerce interface to facilitate an e-commerce transaction associated with the product or service, the instructions further comprising instructions that when executed causing the at least one processing device to:
receive input from the user and, based on the input, complete the e-commerce transaction during the presentation of the base media.

18. The non-transitory computer readable medium of claim 11 wherein the icon is a first icon, and the at least one of the product or the service is a first product or a first service, the instructions further comprising instructions when executed cause the at least one processing device to:
display a second icon different than the first icon, the second icon representing a second product or a second service that is associated with the base media, the second icon configured to cause the processing device to provide supplemental material associated with the second product or service.

19. The non-transitory computer readable medium of claim 18, wherein the second icon is displayed after a cessation of display of the first icon.

20. The non-transitory computer readable medium of claim 18, the instructions further comprising instructions when executed cause the at least one processing device to:
display the second icon during the display of the first icon.

* * * * *